United States Patent
Heine et al.

(10) Patent No.: US 9,404,014 B2
(45) Date of Patent: Aug. 2, 2016

(54) EPOXY RESINS AND SILANE AQUEOUS CO-DISPERSIONS AND THE USES THEREOF

(71) Applicants: Françoise Heine, Ottignies-Louvain-la-Neuve (BE); Karin Van Poppel, Ottignies-Louvain-la-Neuve (BE); Marc J. Rans, Ottignies-Louvain-la-Neuve (BE); Nathalie Wauters, Ottignies-Louvain-la-Neuve (BE)

(72) Inventors: Françoise Heine, Ottignies-Louvain-la-Neuve (BE); Karin Van Poppel, Ottignies-Louvain-la-Neuve (BE); Marc J. Rans, Ottignies-Louvain-la-Neuve (BE); Nathalie Wauters, Ottignies-Louvain-la-Neuve (BE)

(73) Assignee: HEXION INC., Columbus, OH (US)

( * ) Notice: Subject to any disclaimer, the term of this patent is extended or adjusted under 35 U.S.C. 154(b) by 0 days.

(21) Appl. No.: 14/418,723

(22) PCT Filed: Jul. 24, 2013

(86) PCT No.: PCT/EP2013/002189
§ 371 (c)(1),
(2) Date: Jan. 30, 2015

(87) PCT Pub. No.: WO2014/019657
PCT Pub. Date: Feb. 6, 2014

(65) Prior Publication Data
US 2015/0267074 A1    Sep. 24, 2015

(30) Foreign Application Priority Data
Jul. 31, 2012  (EP) .................... 12005547

(51) Int. Cl.
| | | |
|---|---|---|
| *C09D 5/08* | (2006.01) | |
| *C09D 5/02* | (2006.01) | |
| *C09D 163/00* | (2006.01) | |
| *C09D 183/04* | (2006.01) | |
| *C08L 63/00* | (2006.01) | |
| *C08L 83/04* | (2006.01) | |
| *C09D 183/06* | (2006.01) | |
| *B32B 15/092* | (2006.01) | |
| *B32B 27/38* | (2006.01) | |
| *C08G 77/14* | (2006.01) | |

(52) U.S. Cl.
CPC ............... *C09D 163/00* (2013.01); *C08L 63/00* (2013.01); *C09D 183/06* (2013.01); *C08G 77/14* (2013.01)

(58) Field of Classification Search
None
See application file for complete search history.

(56) References Cited

U.S. PATENT DOCUMENTS

| | | | |
|---|---|---|---|
| 5,714,532 A * | 2/1998 | Osterholtz | ........... C08K 5/5435 524/114 |
| 6,221,934 B1 | 4/2001 | Stark et al. | |
| 6,475,621 B1 | 11/2002 | Kohli et al. | |

FOREIGN PATENT DOCUMENTS

| | | |
|---|---|---|
| EP | 0945498 A1 | 9/1999 |
| EP | 1896522 A1 | 3/2008 |
| EP | 2223975 A1 | 9/2010 |
| WO | WO 98/14511 A1 | 4/1998 |
| WO | WO 2011/112452 | 9/2011 |

* cited by examiner

*Primary Examiner* — Michael J Feely

(57) ABSTRACT

The process to prepare a storage stable aqueous co-dispersion of epoxy resins and at least a silane oligomer is given. This aqueous co-dispersion of epoxy resins with a silane as part A, of a curable paint composition in which the part B comprises a hardener and optionally pigments and additives. This epoxy resins with the silane provide equal performance even after several months' storage.

10 Claims, No Drawings

EPOXY RESINS AND SILANE AQUEOUS CO-DISPERSIONS AND THE USES THEREOF

This invention relates to a process to prepare an aqueous co-dispersion of epoxy resins with a silane as part A of a curable composition and in which the part B comprises a hardener.

Epoxy resins are used already for a long time and different vehicles (solvent, powder) have been tried. Due to environmental concern the development of aqueous systems has been more and more proposed to the industry for several types of end applications. It is known that adding silane into water based dispersion leads to unstable end product.

The U.S. Pat. No. 6,221,934 describes stable aqueous emulsions of epoxy resins by using an epoxy-functional surfactant prepared by reacting an amidoamine with the epoxy groups. The epoxy resin is further cured with an amine water compatible oligomer.

In the field of protective coating several options have been proposed, one of them is the use of a metal such as zinc (WO 2011/112452) in combination with water based epoxy resins to provide a stable formulation with good protective properties. The protection of metal surface is also improved by the use of silane derivatives and especially epoxy functional silanes. These derivatives are well known to improve the adhesion of the coating to the metal. The trend is now to provide water based systems to the coating industry, however the silane derivatives formulated in an epoxy water dispersed system often show poor storage stability.

The invention describes stable silane containing waterborne epoxy primer formulations. The way to stabilize the silanes in the presence of water is described, as well as the way to formulate the waterborne epoxy primers.

Silane adhesion promoters are often used in epoxy primers, especially when adhesion to smooth steel is required. However, the water-based silane containing pigment pastes usually show reduced storage stability of a few weeks or a few months. After a few days or maximum 3 months paste storage, the adhesion is usually reduced or completely gone.

Emulsions of some silanes are described in the literature but not in presence of epoxy resin or other pigments or coating additives (EP 1896522).

The present invention is about stable waterborne epoxy primers containing silane adhesion promoter with at least 3 months storage stability and even above 6 months storage stability. We have found that after this storage the adhesion to smooth steel is maintained to the initial value. The process conditions to be used in order to achieve this stability are part of this invention.

Objects of this invention are as follows:
(1) a process to make an aqueous co-dispersion of epoxy resins and at least a silane or silane oligomers,
(2) a composition comprising epoxy resin emulsion or dispersion and the silane emulsion or silane oligomer emulsion,
(3) the above epoxy composition formulated in the presence of a curing agent, as paint composition.

The composition of the invention may also contain solvents, pigments, fillers and additives known from the skilled person in the art.

The silane oligomers useful for this invention are based on: epoxy silane oligomer synthesized using controlled hydrolysis and condensation of an epoxy silane monomer with continuous water introduction and a strong cationic exchange resin as a catalyst. The epoxy silane monomer may be either a glycidoxy or cycloaliphatic epoxy silane having 2 or 3 functional alkoxy groups or the epoxy silane monomers may be based on glycidoxy epoxy silanes or cycloaliphatic epoxysilanes in combination with other monomeric silanes that can provide specific organofunctional features like vinyl, methacryl, alkyl, polyalkyleneoxide and others with the proviso that they don't interact with epoxy functionalities. Commercial example is the CoatOSil MP200 available from Momentive Performance Materials Inc.

The epoxy resins useful for the invention are based on: bisphenol type epoxy resin obtained by condensation between bisphenol A [2,2-bis(4'hydroxyphenyl)-propane] or bisphenol F and epichlorohydrin or the like. Commercially available bisphenol type epoxy resins are liquid or solid and have a molecular weight of about 350 to about 3750 and an epoxy equivalent of about 180 to about 3500. Preferred examples of the aqueous epoxy resins are bisphenol-A and/or bisphenol-F based epoxy resins having from 350 to 3750 molecular weight, nonionically dispersed in water with or without glycol ether cosolvents. Commercial examples of the aqueous epoxy resins include, for example, Bisphenol A resins, like EPI-REZ Resin 3510-W-60 (emulsion), EPI-REZ Resin 3520-WY-55, EPI-REZ Resin 3521-WY-53, EPI-REZ Resin 3523-WH-53, EPI-REZ Resin 6520-WH-53, EPI-REZ Resin 3540-WY-55, EPI-REZ Resin 3546-WH-53 EPI-REZ Resin 5522-WY-55, EPI-REZ Resin 6530-WH-53 (dispersions), all available from Momentive Specialty Chemicals Inc.

The curing agents of the invention are compatible with aqueous dispersions without adding acid salts. Commercial examples of the aqueous curing agents are EPIKURE Curing Agent 6870-W-53 or EPIKURE Curing Agent 8545-W-52 and the like available from Momentive Specialty Chemicals Inc.

These curable systems contain one or more epoxy resins and one or more curing agents.

These aqueous curable epoxy resin systems can be further catalyzed with a commercially available tertiary amine accelerator, such as 2,4,6-tris(dimethyl aminomethyl phenol) or phenols to cure at lower temperatures. Examples of such materials are EPIKURE Curing Agent 3253 from Momentive Specialty Chemicals Inc. or DMP-30 from Rohm and Haas.

As the surface active agent, there can be mentioned, for example, derivatives of polyethylene and/or polypropylene glycol, such as or Pluronics or Synperonics, surfactants based on natural fatty acids (as stearic acid) and sorbitol such as Span 60, ethoxylated sorbitan ester based on palmetic acid such as Tween 40 or alcoxylated ethylene copolymer such as Brij S721 (Polyoxyethylene (21) stearyl ether) or S2 (Polyoxyethylene (2) stearyl ether) available from CRODA or derivatives of polyethylene and/or polypropylene glycol, such as or Pluronics or Synperonics and epoxy containing derivatives.

These aqueous epoxy resin systems can serve as components of paints and coatings for application to substrates such as, for example, metal, wood, glass substrates and cementitious structures. To prepare such paints and coatings, these resins or amines are blended with primary, extender and anticorrosive pigments, and optionally, additives such as surfactants, antifoam agents, rheology modifiers and mar and slip reagents. The selection and amount of these pigments and additives depends on the intended application of the paint and is generally recognized by those skilled in the art.

The process conditions to apply in order to achieve a storage stable aqueous epoxy resin formulation containing a silane are as follows:
the silane is emulsified in presence of emulsifier such as the one given above and at temperature between 20 and 65°

C., this silane emulsion is further blended at room temperature with an epoxy water based dispersion.

In another embodiment the pigments and additives are added to the blend of the epoxy resin emulsion or dispersion and the silane.

EXAMPLES

Epoxy-Silane Water Based Dispersion

Example of Cold-Blending: MP200 Emulsion Preparation

In the case of cold blending, the silane emulsion can be produced by various methods and with a large range of surfactants.

Recipe:
Silane oligomer: CoatOsil MP200 40%
    Span 60 2%
    Tween 40 2%
    Water 56%

1) Emulsion by Inversion Method

In a beaker glass, 2 g Span 60 and 2 g Tween 40 are weighed and heated in a 60° C. water bath to melt the solid surfactant. CoatOsil MP200 (40 g) are added and the mixture are stirred with a mechanical stirrer for several minutes until homogenous. Cool the mixture to below 35° C. and increase the stir speed to 3500 rpm or use a Turrax high-speed homogenizer at 4000 rpm. Gradually add water until the mixture inverts around 66% solids, for the Turrax inversion is observed at around 60% solids. Continue mixing for a few minutes and check particle size. When the desired particle size is reached, add the remainder of the water to dilute the emulsion to the required solids content.

2) Emulsion by Solid Addition Method

In a beaker glass, 21 g of water is heated in a 60° C. water bath. The surfactants Span 60 (2 g) and Tween 40 (2 g) are added and stirred with a mechanical stirrer to melt the solid surfactant. Once homogenous, the mixture is cooled down to below 35° C. The stir speed is increased to 3500 rpm and the CoatOsil MP200 is added gradually. After addition, continue stirring until the desired particle size is reached. Dilute the emulsion to the required solid content by adding the remainder of the water.

3) Variations on the Recipe

The surfactants Span and Tween can be replaced by a mixture of poloxamers (block copolymer based on polyethylene and polypropylene oxide) like Pluronic® from BASF or alcoxylated ethylene copolymer such as Brij S721 (Polyoxyethylene (21) stearyl ether) or S2 (Polyoxyethylene (2) stearyl ether) available from CRODA or derivatives of polyethylene and/or polypropylene glycol, such as or Pluronics or Synperonics and epoxy containing derivatives.

The above described emulsification methods can be applied.

The silane emulsion is blended with one epoxy resin dispersion (emulsion) or a blend of epoxy dispersions (emulsions). Examples are with EPI-REZ Resin 6530-WH-53, EPI-REZ Resin 3520-WY-55, EPI-REZ Resin 3521-WY-53, EPI-REZ Resin 3523-WY-53 or EPI-REZ Resin 6520-WY-53.

Preparation of the paint composition, the paint consists out of a Part A and a Part B. The Part A is always the part of the paint containing the pigments and fillers currently used in anticorrosive paints, this could be based on the epoxy resin or on the curing agent; the silane can be in the Part A or in the Part B. If the silane oligomer is used with the Part A it is often added in the so called "let down" of the process.

Paint Example 1 (Comparative)

The (pure) CoatOSil MP200 silane oligomer (further named MP200) and the CoatOSil MP200 emulsion were used as additives in the let down of the primers (Part A). This was compared with no silane in the paint. Also, stability of the paste was checked after 4 months.

Here are the 2 reference starting formulations without any silane. 5 g pure MP200 were added for 1000 g formulation. For the MP200 emulsion, this corresponds to 12.71 g MP200 emulsion.

TABLE 1a

Comparative Composition Example 1a

| | Weight, g |
|---|---|
| Ingredients Part A | |
| EPI-REZ 3520-WY-55 | 300 |
| Dowanol PPH (Dow) | 28.05 |
| EFKA2526 (EFKA) | 2.74 |
| Ti-Pure R960 (DuPont) | 91.19 |
| Tremin 283-600EST (Sibelco) | 89.55 |
| Albawhite 80 (Sachtleben) | 61.06 |
| Heucophos CAPP (Heubach) | 84.93 |
| MicaS (Aspanger) | 6.54 |
| EPI-REZ 3520-WY-55 | 149.43 |
| Silane | See note above |
| Demi-water | 92.41 |
| Ingredients Part B | |
| EPIKURE 8545-W-52 | 93.19 |
| Raybo 80 (Raybo Chemicals) | 0.9 |
| Total | 1000 |

TABLE 1b

Comparative Composition Example 1b

| | Weight, g |
|---|---|
| Ingredients Part A | |
| EPI-REZ 6520-WH-53 | 300 |
| Dowanol PPH (Dow) | 27.23 |
| EFKA2526 (EFKA) | 2.66 |
| Ti-Pure R960 (DuPont) | 88.53 |
| Tremin 283-600EST (Sibelco) | 86.93 |
| Albawhite 80 (Sachtleben) | 59.27 |
| Heucophos CAPP (Heubach) | 82.45 |
| MicaS (Aspanger) | 6.35 |
| EPI-REZ 6520-WH-53 | 142.16 |
| Silane | See note above |
| Demi-water | 89.71 |
| Ingredients Part B | |
| EPIKURE 6870-W-53 | 113.84 |
| Raybo 80 (Raybo Chemicals) | 0.88 |
| Total | 1000 |

Panels were sprayed with these formulations. The cure schedule was 20 minutes at 70° C. then 2 weeks at 23° C. The panels were exposed for 500 hours in neutral salt spray, and then evaluated for corrosion and adhesion, according to ISO 7253-84 (saltspray resistance).

The silane is needed to get good performance on smooth steel panels (Gardobond OC). However a very significant decrease in performance was observed on smooth steel after 4 months storage of the Part A containing the silane oligomer. This shows that the silane is no more efficient as an adhesion promoter after 4 months storage; see Table 2. Adhesion was tested according to a visual evaluation at the cross (knife scratching) after exposure 500 hours saltspray exposure (rating 5=perfect, 1=poor)

TABLE 2

Stability of the Silane in the Paint 1a and 1b

| | Rating 1-5 (5 is excellent, 1 is poor) | |
|---|---|---|
| | Salt Spray, 500 hrs, Gardobond OC | Salt Spray, 500 hrs, Gardobond OC, 4 months ageing |
| ER3520/EK8545, no silane | 1 | 2 |
| ER3520/EK8545, MP200 in let down | 5 | 1 |
| ER3520/EK8545, MP200 emulsion in let down | 5 | 1 |
| ER6520/EK6870, MP200 emulsion in let down | 4 | 1 |

Example 2

Example 2a, the process to prepare the co-dispersion of epoxy and silane in water is given in the first section of the examples. The silane emulsion can be fresh or even aged (at room temperature) for some weeks. Epoxy-silane blend of these examples are cold blend of EPI-REZ 6530-WH-53 with the MP200 emulsion.

Example 2b is based on a 3 months old MP200 emulsion, mixed with EPI-REZ 6530-WH-53, then aged (at room temperature) for 1 year as a blend.

TABLE 3

Composition of Examples 2a and 2b

| | Weight, g |
|---|---|
| Ingredients Part A | |
| EPIKURE 8545-W-52 | 114.15 |
| Dowanol PPH (Dow) | 26.88 |
| EFKA2526 (EFKA) | 2.6 |
| Ti-Pure R960 (DuPont) | 86.74 |
| Tremin 283-600AST (Sibelco) | 85.17 |
| Albawhite 80 (Sachtleben) | 58.08 |
| Heucophos CAPP (Heubach) | 80.78 |
| MicaS (Aspanger) | 6.22 |
| Additol VXW 6208 (Cytec) | 5.63 |
| Demi-water | 87.89 |
| Raybo 80 (Raybo Chemicals) | 0.86 |
| Ingredients Part B | |
| EPI-REZ 6530-WH-53 with the MP200 emulsion | 445.17 |
| Total | 1000 |

| | Rating 1-5 (5 is excellent, 1 is poor) Salt Spray, 500 hrs, Gardobond OC |
|---|---|
| 2a | 4-5 |
| 2b | 4-5 |

We claim:

1. A process for making a storage stable aqueous co-dispersion comprising:
   emulsifying at least one silane or silane oligomer in the presence of an emulsifier at a temperature between 20° C. and 65° C., to form a silane or silane oligomer emulsion; and
   blending the silane or silane oligomer emulsion with an epoxy resin emulsion or an epoxy resin dispersion at room temperature, to form the aqueous co-dispersion;
   wherein the epoxy resin of the epoxy resin emulsion and the epoxy resin dispersion comprises a liquid or solid bisphenol type epoxy resin having an epoxy equivalent weight of about 180 to about 3500.

2. The process of claim 1, wherein the silane oligomer comprises an epoxy silane oligomer formed from an epoxy silane monomer or a combination of an epoxy silane monomer and other monomeric silanes; wherein the epoxy silane is selected from the group consisting of a glycidoxy silane having 2 or 3 functional alkoxy groups, and a cycloaliphatic epoxy silane having 2 or 3 functional alkoxy groups; and wherein the other monomeric silanes have organofunctional features selected from the group consisting of vinyl, methacryl, alkyl, and polyalkyleneoxide, with the proviso that the organofunctional features do not interact with epoxy functionalities.

3. The process of claim 1, wherein the liquid or solid bisphenol type epoxy resin is obtained by condensation between bisphenol A or bisphenol F and epichlorohydrin.

4. The process of claim 1, wherein the emulsifying of the at least one silane or silane oligomer is performed by an inversion emulsion method or a solid addition emulsion method.

5. A process for making a curable composition comprising:
   making a storage stable aqueous co-dispersion according to the process of claim 1;
   optionally combining at least one of pigment, filler, and additives with the aqueous co-dispersion;
   and combining the aqueous co-dispersion with a water compatible curing agent;
   wherein the water compatible curing agent optionally contains at least one of pigment, filler and additives.

6. The process of claim 5 wherein the pigment and additives are combined with the aqueous co-dispersion.

7. The process of claim 5, wherein the aqueous co-dispersion is aged for at least 6 months at room temperature prior to the optional and required combining steps.

8. The process of claim 5, further comprising adding a catalyst to the curable composition, wherein the catalyst is selected from the group consisting of tertiary amine and phenol.

9. A curable composition formed by the process of claim 5, wherein the curable composition is a paint formulation capable of providing, when cured, corrosion protection to steel panels after 500 hours of salt spray exposure.

10. The paint formulation of claim 9, further comprising at least one additive selected from the group consisting of primary pigments, extender pigments, anti-corrosive pigments, surfactants, antifoam agents, rheology modifiers, mar reagents, and slip reagents.

* * * * *